(12) United States Patent
Bobier

(10) Patent No.: US 6,968,014 B1
(45) Date of Patent: Nov. 22, 2005

(54) MISSING CYCLE BASED CARRIER MODULATION

(75) Inventor: Joseph A. Bobier, Sarasota, FL (US)

(73) Assignee: XG Technology, LLC, Sarasota, FL (US)

( * ) Notice: Subject to any disclaimer, the term of this patent is extended or adjusted under 35 U.S.C. 154(b) by 0 days.

(21) Appl. No.: 09/511,470

(22) Filed: Feb. 23, 2000

(51) Int. Cl.$^7$ .............................................. H03K 7/06
(52) U.S. Cl. ...................... 375/271; 375/295; 375/309; 375/316
(58) Field of Search .............................. 375/141, 259, 375/268, 269, 271, 272, 276, 278, 285, 286, 375/293, 295, 296, 300, 302, 303, 309, 316, 375/320, 334, 346, 350, 351

(56) References Cited

U.S. PATENT DOCUMENTS

| | | | |
|---|---|---|---|
| 4,058,769 A | 11/1977 | Alderman | |
| 4,245,184 A * | 1/1981 | Billings et al. | 323/235 |
| 4,266,201 A | 5/1981 | Belfatto | |
| 4,411,005 A | 10/1983 | Leslie | |
| 5,038,051 A | 8/1991 | Firman et al. | |
| 5,105,165 A * | 4/1992 | Bien | 330/149 |
| 5,136,614 A * | 8/1992 | Hiramatsu et al. | 375/141 |
| 5,193,222 A | 3/1993 | Sasaki | |
| 5,223,840 A * | 6/1993 | Cronyn | 342/170 |
| 5,249,201 A | 9/1993 | Posner et al. | |
| 5,266,506 A * | 11/1993 | Green, Jr. | 438/172 |
| 5,592,131 A | 1/1997 | Labreche et al. | |
| 5,612,978 A | 3/1997 | Blanchard et al. | |
| 5,864,585 A | 1/1999 | Erisman | |
| 5,949,296 A | 9/1999 | Jacobson | |
| 6,081,171 A * | 6/2000 | Ella | 333/189 |
| 6,151,278 A * | 11/2000 | Najarian | 368/12 |

FOREIGN PATENT DOCUMENTS

JP  59-10060  * 1/1984  ........... H04L 27/26

* cited by examiner

*Primary Examiner*—Chieh M. Fan
(74) *Attorney, Agent, or Firm*—Dennis L. Cook, Esq.

(57) ABSTRACT

A sinusoidal R.F. carrier is modulated for the transmission of digital binary datastreams through the deletion of carrier wavelets. These wavelets are defined between zero crossover positions representing zero energy locations. One or more wavelets are switched out of the carrier at the zero crossing positions to avoid sideband generation occasioned by electromagnetic energy disturbance. Transmissional amplification as well as receptional amplification is carried out with non-resonating amplifier architecture.

39 Claims, 9 Drawing Sheets

MISSING CYCLE BASED CARRIER MODULATION

CROSS-REFERENCE TO RELATED APPLICATIONS

Not applicable

STATEMENT REGARDING FEDERALLY SPONSORED RESEARCH

Not applicable.

BACKGROUND OF THE INVENTION

Radio transmission of information traditionally involves the employment of electromagnetic waves or radio waves as a carrier. Where the carrier is transmitted as a sequence of fully duplicated wave cycles or wavelets, no information is considered to be transmissible. To convey information, historically, the carrier has superimposed on it a sequence of changes which can be detected at a receiving point or station. The changes imposed correspond with the information desired to be transmitted. A provision of such carrier changes is generally termed to be a "modulation".

Where the amplitude of the carrier is changed in correspondence with information to be conveyed, the carrier is said to be amplitude modulated (AM). Correspondingly, where the frequency of the carrier is changed in accordance with information to be conveyed, either rarified or compressed wave cycles are developed and the carrier is said to be frequency modulated (FM), or in some applications it is considered to be phase modulated. Where the carrier is altered by interruption corresponding with information, it is said to be pulse modulated.

Currently, essentially all forms of the radio transmission of information are carried out with amplitude modulation, frequency modulation, pulse modulation or combinations of them. With all such forms of modulation, inefficiencies necessarily are present. For instance, a one KHz audio AM modulation of an R.F. carrier operating at one MHz will be at a carrier utilization ratio of 1:1000 and similar carrier utilization occurs with corresponding FM modulation. For all forms of currently employed carrier modulation, frequencies higher and lower than the frequency of the R.F. carrier are produced. Since they are distributed over a finite portion of the spectrum on each side of the carrier frequency, they are called side frequencies and are referred to collectively as sidebands. The sidebands contain all the message information and it has been considered that without them, no message can be transmitted. Sidebands, in effect, represent a distribution of power or energy from the carrier and their necessary development has lead to the allocation of frequencies in terms of bandwidths by government entities in allocating user permits within the radio spectrum. This necessarily limits the number of potential users for a given R.F. range of the spectrum.

Over the previous few decades, electronically derived information has taken the form of binary formatted datastreams. These datastreams are, for the most part, transmitted through telecommunication systems, i.e., wire. Binary industry communication in general, commenced with the networking of computer facilities in the mid 1960s, an early networking architecture being referred to as "Arpanet". A short time later, Telenet, the first public packet-switched network, was introduced to commerce. As these networks grew, protocols for their use developed. For example, a coding protocol, ASCII (American Standard Code for Information Interchange) was introduced in 1964. Local Area Networks (LAN) proliferated during the 1970s, the oldest and most prominent, Ethernet, having been developed by Metcalfe in 1973. Under the Ethernet concept, each station of a local system connects by cable to a transceiver and these transceivers then are inter-linked. In 1983, the Institute of Electrical and Electronic Engineers (IEEE) promulgated Ethernet with some modifications, as the first standard protocol for local area networks. That protocol remains a standard for essentially all forms of database conveyance or exchange.

While binary datastream transmission by wire has improved substantially in terms of data transfer rates, that improvement has not been the case where transmission is by utilization of the R.F. spectrum. The transmission inefficiencies occasioned with the modulation of an R.F. carrier have remained to the extent that an efficient high-speed transmission of binary information utilizing an R.F. carrier persists as an elusive goal of investigators.

BRIEF SUMMARY OF THE INVENTION

The present invention is addressed to a system, method and apparatus wherein digital datastreams are radio transmitted at a high level of efficiency and speed and without a concomitant substantial formation of side frequency phenomena. Thus, bandwidths assigned for this transmissional task are quite narrow, approaching the singular frequency of the R. F. carrier itself.

Referred to as "missing cycle modulation" (MCM), an R. F. carrier comprised of a continuum of full cycle sinusoidal wavelets extending between zero crossover points or positions is modulated to carry binary information by selectively deleting one or a succession of carrier wavelets. Such a deletion may be assigned to represent either a binary one or zero value. This deletional modulation is carried out by switching removal of data related wavelets only at the sinusoidal zero crossing positions defining them. Inasmuch as these zero positions correspond with the absence of electromagnetic wave energy, no wave disturbances are invoked to, in turn, produce side frequencies. As a consequence, the assigned carrier frequencies may be quite close together in value to provide a substantially improved utilization of the radio spectrum for binary data transmittal.

In general, the assemblies transmitting datastream binary information employ a local oscillator to generate a R. F. carrier. The crossover positions defining wavelets of the carrier are identified at a phase tracking function. These identified crossover locations then are synchronized with the binary data of the datastream to develop synchronizing control outputs. Such synchronization may, for instance, be implemented with ANDing and timing functions.

The synchronizing control outputs are employed to control a carrier modulator, which switches out carrier wavelets in correspondence with the binary data being transmitted. Amplification of the modulated R. F. carrier for antenna-based transmission or broadcast is carried out using a non-resonating amplification architecture, such as a Class A amplification stage.

Another approach to the transmission of sinusoid wavelets utilizing the MCM technique of the invention is to the employment of a synthesizer wherein the wavelets are synthesized in response to a programmed input corresponding with the binary information of the data stream to be transmitted and with the input of the desired carrier. The resultant information output signal then is a synthesized one which essentially is identical to the carrier modulated waveforms evolved by switching as described above.

The receiver stations or receiver assemblies which receive the transmitted modulated R. F. carrier will respond to an antenna output and extract a received modulated carrier signal from the antenna output without causing a distortion of it. This, as in the case of transmission, is implemented with a non-resonating pre-amplification stage performing in conjunction with an antenna assembly. In one implementation, a band-pass filter of a narrow multi-stage variety is employed to extract the carrier signal, whereupon the signal is demodulated by detecting the effective absence and presence of the wavelets to identify binary information. Then, a binary information stream may be derived from the demodulated received modulated carrier signal utilizing non-resonating amplification procedures to form a binary information stream corresponding with the initially transmitted information stream. In a preferred embodiment, the broadband amplified output of an antenna assembly is submitted to very narrow-bandpass filtering of a variety utilizing a crystal implemented R.F. filter. This filter passes the modulated carrier frequency to provide an output representing the presence and absence of wavelet data. That data then may be converted to a digital data stream, for example, utilizing a squaring amplifier which may be implemented as an overdriven R.F. amplification stage.

Another implementation of the receiving assembly employ a digital signal processor (DSP) operating in conjunction with a reference oscillator which provides a reference output at the carrier frequency. Utilizing comparative procedures, a data output is developed which is squared to recreate the original datastream.

The transmitting assemblies of the invention may be employed to simultaneously broadcast from more than one carrier frequency defined channels. With this arrangement, the serial datastream is introduced to a latching or register function, which, in turn, provides an n-bit word output, each bit of which is introduced to a transmission assembly performing at a unique carrier frequency. The outputs of these transmission assemblies then may be simulcast to a multiple channel receiving assembly, each channel of which is provided to respond to one of the unique carrier frequencies.

A receiving assembly or station also is described which employs a mixer function performing in conjunction with a local receiver oscillator having a frequency output selected greater than the MCM modulated carrier input. This approach facilitates the filtering function for single channel implementation as well as multi-channel implementations. In the latter regard, the higher frequency-summing form of intermediate frequency development enhances the spacing of intermediate modulating carrier frequencies introduced to a corresponding multistage filtering architecture.

Other objects of the invention will, in part, be obvious and will, in part, appear hereinafter.

The invention accordingly, comprises the method, system and apparatus possessing the construction, combination of elements, arrangement of parts and steps, which are exemplified in the following detailed description.

For a fuller understanding of the nature and objects of the invention, reference should be had to the following detailed description taken in connection with the accompanying drawings.

BRIEF DESCRIPTION OF THE DRAWINGS

FIG. 2A is a schematic perspective view of wave and pulse shapes describing a timing network function of the invention;

DETAILED DESCRIPTION OF THE INVENTION

The wireless transmission of digital binary datastreams in accordance with the instant invention is one wherein sinusoid-defining wavelets each with a period representing 360° are selectively deleted from a carrier to represent a select binary value. For example, the absence of such a wavelet or sequence of them from an otherwise continuous carrier sequence of wavelets defining a carrier waveform may represent either a logic zero or logic one depending upon the protocol utilized. This type of modulation is referred to as "missing cycle modulation" (MCM). Because these wavelets are selectively deleted by acting upon the carrier waveform at zero crossing positions, no energy disturbances, which would otherwise be the occasion of side frequencies or sidebands are developed. Thus, the system and method of the invention may perform with a very narrowly allocated bandwidth which approaches the carrier frequency itself.

Figure 1:
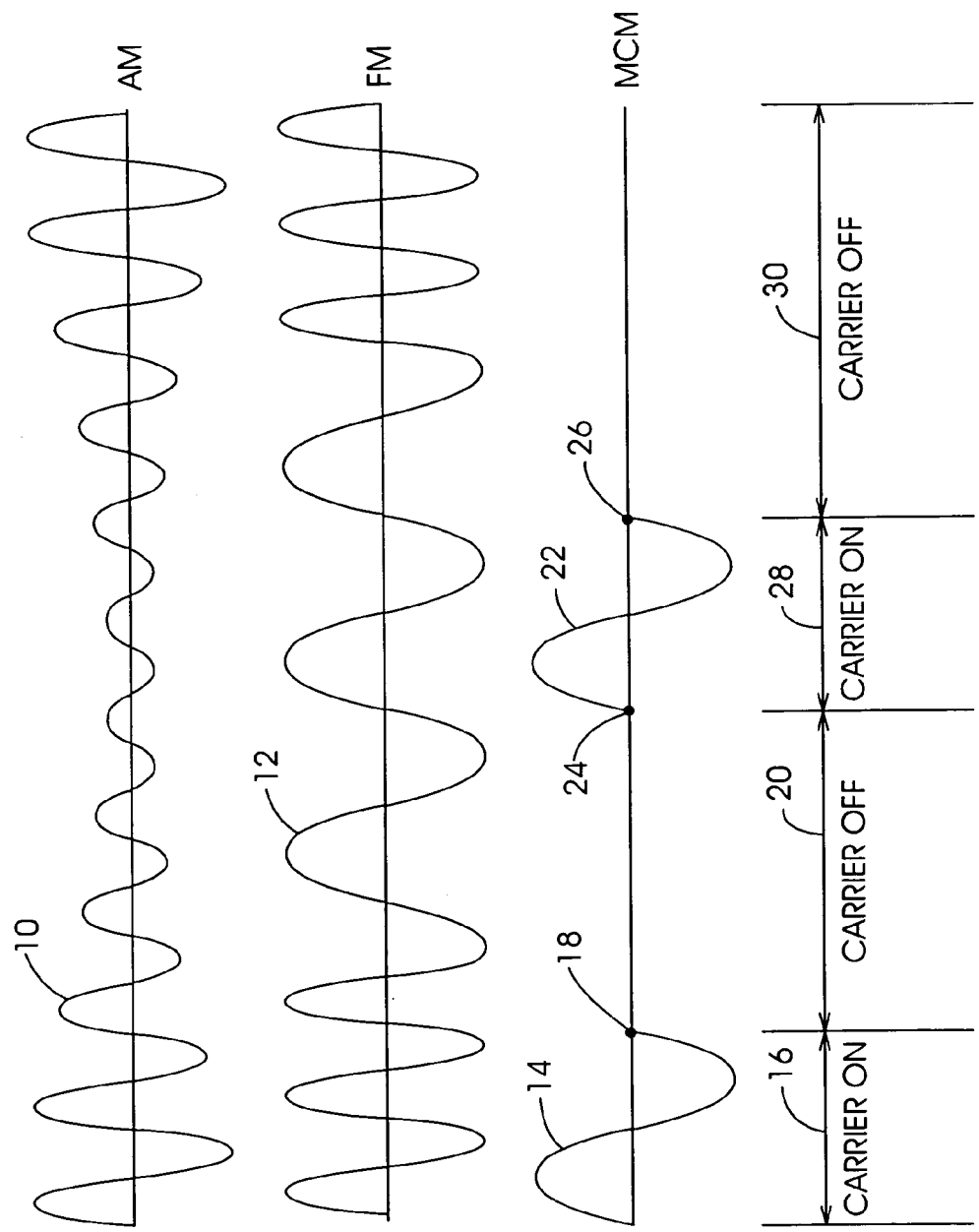
FIG. 1 is a diagram showing amplitude modulation waveforms, frequency modulation waveforms and missing cycle modulation waveforms.

Looking to FIG. 1, a comparison of missing cycle modulation with conventional amplitude modulation and frequency modulation is presented. An amplitude-modulated waveform is represented at 10. The waveform 10 shows a variation of carrier amplitude from an otherwise continuously repetitive state. Those variations may be detected by suitable circuits at a receiver to extract information. Because the modulation is arbitrary in nature, sidebands will be developed with amplitude modulation. Corresponding frequency modulation is represented at waveform 12. Waveform 12 reveals that the amplitude of the carrier remains unchanged at all times and the frequency is made to fluctuate symmetrically above and below the average value of the carrier. In effect, the carrier frequency either rarifies or compresses under modulation. A symmetrical sinusoidal carrier waveform for missing cycle modulation initially is represented at waveform 14, representing a continuous carrier performing over an interval identified at arrow 16. Note, however, that the carrier waveform 14 is switched off at crossover position 18. The carrier remains off for a period represented at arrow 20, which corresponds at least with the period of a complete wavelet which, is a 360° component of the sinusoid carrier. This carrier-off condition represents a binary value, which may be either zero or one. The opposite binary value is represented by switching the carrier on, for at least a wavelet period representing a 360° sinusoid. Such a carrier on wavelet is represented at waveform 22. Note that wavelet 22 commences at the crossover position 24 and is switched off at the crossover position 26, the wavelet 22 defining a wavelet period represented at arrow 28. Wavelets are deleted only for 360° full cycle periods since switching at a zero crossover at a location representing a half cycle will evoke electromagnetic distortion at the remaining half cycle. Thus, binary data is defined by one or more full, 360° wavelets. By so switching at crossover positions defining wavelets as at 24 and 26, no energy disturbances are occasioned to evoke the presence of sidebands. The carrier may remain switched off for a number of periods otherwise representing a sequence of wavelets, each interval thereof representing some designated binary value. Such an interval is shown at arrow 30 extending to the commencement of a next wavelet at waveform 32. The criteria of this missing cycle modulation is that the wavelet is a sinusoid of 360° extent and that the carrier be switched off and on only at a zero crossover or zero energy position. As is apparent, missing cycle modulation provides for a highly efficient utilization of the carrier with, for instance, a ratio of utilization of the carrier to information approaching 1:1. Speed of transmission may be commensurate with current cable-based digital transmission rates.

A variety of implementations of missing cycle modulation are available. Looking to FIG. 2, a transmission station or assembly is represented generally at 40. The station 40 is formed with a local oscillator 42, which generates a carrier waveform at a select carrier frequency. As noted above, that R.F. carrier exhibits a waveform with a continuous sequence of wavelets, and the wavelets will be represented as sinusoids of at least 360° extent defined between crossover positions and commencing in a positive-going sense. The oscillator function 42 may be provided, for example, as a voltage controlled oscillator marketed as a model POS-100 by Mini-Circuits, Inc. of Brooklyn, N.Y. Information concerning voltage controlled oscillators may be provided, for instance, in the following publication:

ARRL Handbook, p 14.35 (1999), The American Radio Relay League, Inc., Newington, Conn.

Station 40 typically will receive a digital binary datastream from a given source, for example, introduced through an Ethernet protocol as represented at block 44. Because the modulation or switching of the carrier to produce binary information must occur at zero crossing positions, phase tracking or zero crossing detection is carried out with respect to the carrier waveform as represented at arrow 46 and block 48. The tracking function at block 48 may be carried out, for example, by a phase detector such as that marketed by Mini-Circuits, Inc. (supra) as a model MPD-21. A variety of high-speed operational amplifier implementations for detecting zero thresholds is available in the art. The result of phase tracking, however, is to provide a crossover signal or crossover output as represented at arrow 50. Phase detectors are described in the following publication:

ARRL Handbook, pp 14.37–14.40, (1999), The American Radio Relay League, Inc. (supra)

This potential zero crossing switching position of the waveform and the digital binary data input from block 44 as represented at arrow 52 are logically ANDed at one component represented at block 54 of a synchronizer assembly represented generally at 55. Accordingly, a binary logic signal within the datastream 52 is synchronized with a zero crossing position of the carrier waveform at function 54 and the resultant carrier synchronized information output is represented at arrow 56. The signals at arrow 56 will have a period or duration at least corresponding with the duration of a wavelet of the carrier. Because of propagation delays and the like, the output at arrow 56 is seen directed to a timing network 58 of the synchronization assembly 55 which functions, in effect, to delay modulation of the carrier waveform, for example, by the period of one wavelet. The resultant synchronizing control outputs are directed, as represented by arrow 60 to a modulator/switch function 62. Modulator/switch function 62 responds to the local oscillator generated carrier as represented at arrows 46 and 64 and functions to turn off the carrier with respect to a designated binary value for an interval of at least one wavelet cycle. For example, as shown at the period arrow 20 in FIG. 1. A resultant missing cycle modulated output, which is a selectively interrupted waveform at the carrier frequency, is provided as represented at arrow 66. In general, modulator 62 may be implemented as a high-speed gallium arsenide switch which carries out switching at the zero crossover threshold points, involved in wavelet definition. Switching functions as discussed in connection with block 62 may assume a variety of implementation. See the following publications in this regard:

ARRL Handbook, pp 15.13–15.14, (1999) The American Radio Relay League, Inc. (supra)

S. A. Maas, "Microwave Mixers" (1993), ch. 7.3, Artech House, Inc., Div of Horizon House Pub., Norwood, Mass.

Because the switching may not be perfectly synchronized to occur in conjunction with a zero crossing location, a harmonic filter represented at block 68 is employed to strip off any residual harmonics otherwise generated due to switching imperfections. The thus filtered transmission output is provided as represented at arrow 70 to a radio frequency (R.F.) transmission assembly represented generally at 72 which is comprised of a Class A type of R.F. amplifier represented at 74 and a transmission antenna 76. A Class A amplification is called for inasmuch as no ringing or tank circuit type of amplification implementation is desired which would tend to recreate sinusoid signals in the switched-off gaps which define digital data. The amplifier function represented at 74 may be implemented, for instance, as a high power R.F. amplifier marketed, for example, as a Model TIA-1000-1R8 by Mini-Circuits, Inc. (supra). Additional description of Class A amplifiers is described, for example, in the following publication:

ARRL Handbook, p 13.2 (1999), The American Radio Relay League, Inc supra.

The transmission station 40 generally will exhibit a capability for transmitting or broadcasting data at speeds, which are directly proportional to the carrier frequency. For example, a one MHz R.F. carrier may transmit data at up to one MBPS where the system designer chooses to use single wavelet data representation. Of course, the single bit also can be represented by two or more sequential wavelets or the absence thereof to designate either a binary one or a binary zero.

Figure 2:
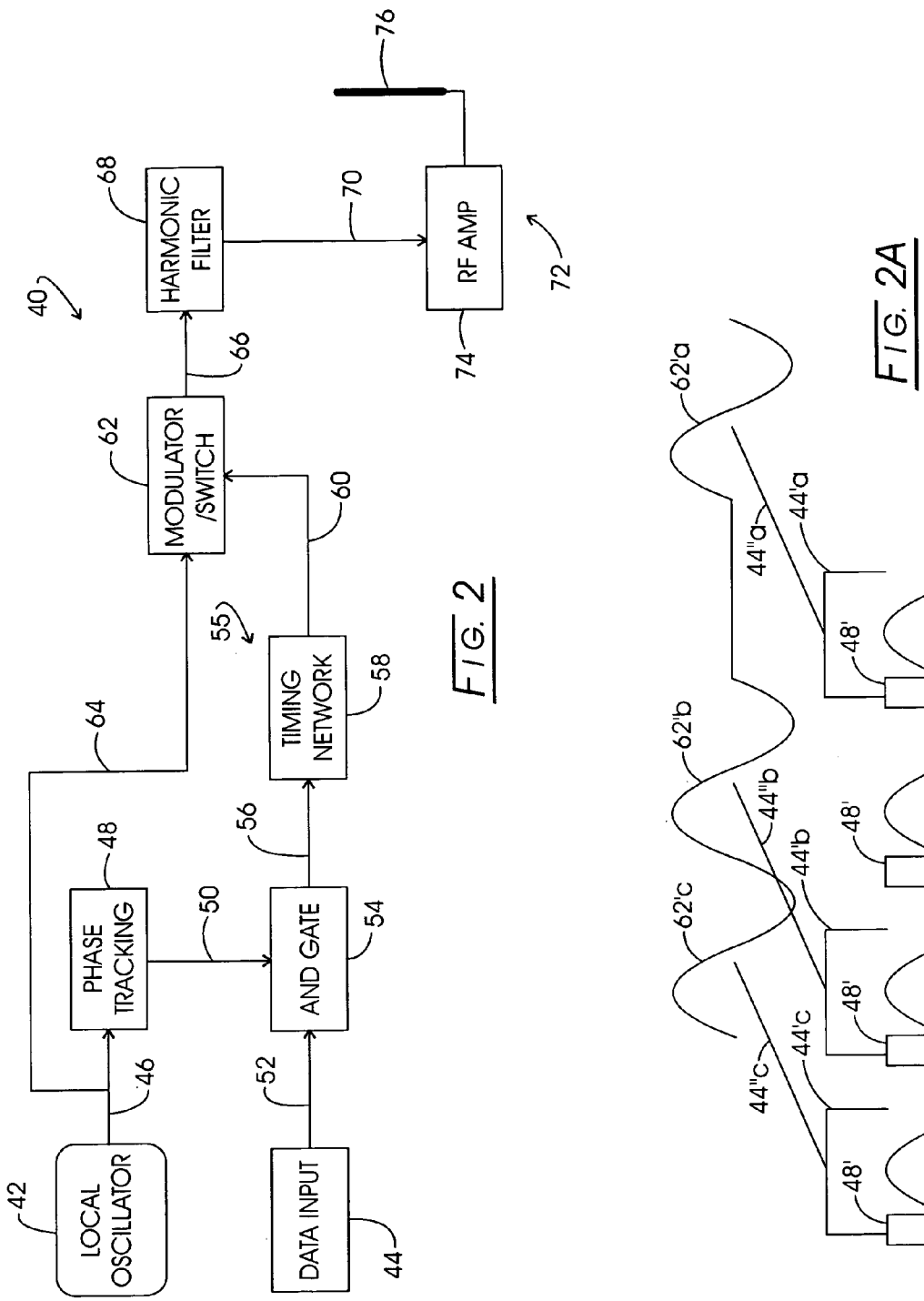
FIG. 2 is a block schematic diagram of a transmitter assemblyk or station employing missing cycle modulation.

Referring momentarily to FIG. 2A, a schematic, perspective representation of the delay feature associated with timing network 58 is set forth. In the figure, signals such as pulses and sinusoids are identified by representation in primed fashion corresponding with their blocks of derivation as set forth in FIG. 2. Looking to the figure, the carrier wave sinusoid evolved from local oscillator 42 is represented at 42' as it might be displayed in scrolling fashion from left to right in the sense of the figure. The time aspect of such scrolling is represented by the time arrow 78. Zero crossing phase tracking as described in conjunction with block 48 will evolve a sequence of pulsed outputs at line 50 which are represented at 48'. Thus, a pulse commences at the start of every positive-going half cycle of the carrier sinusoid 42'. The serial binary datastream, introduced as represented at block 44, will produce a sequence of information conveying pulses and gaps, as represented at 44'a–44'c, a gap being represented between pulses 44'a and 44'b. In the instant demonstration, the function of the timing network 58 is to time shift the wavelets to be transmitted, for example, to the extent of 360° as represented at the wavelet sequence 62'a–62'c. These wavelets also may be represented in connection with line 70 of FIG. 2 with the same sinusoidal configuration but with a higher amplitude. The time shift is represented by the connector lines 44"a–44"c which function to illustrate the relationship of the originally incoming datastream as represented at block 44 with respect to the ultimately transmitted and time shifted wavelets.

Figure 3:
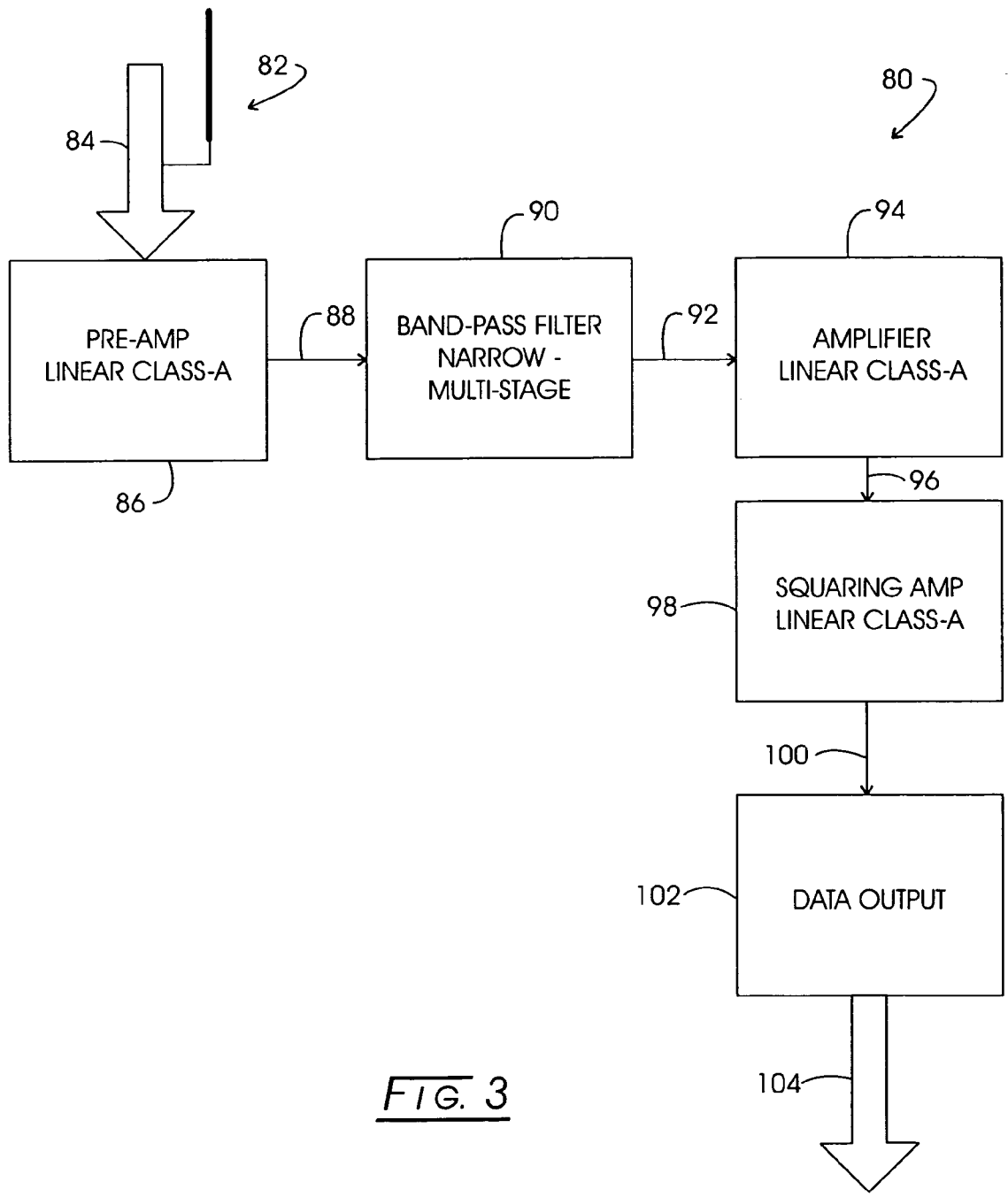
FIG. 3 is a block schematic diagram showing a receiver station configured for response to a carrier having been modulated in accordance with the invention.

Now considering the receiving station or assembly, which responds to the MCM broadcast or transmission, reference is made to FIG. 3 wherein one version of such receiving station is represented in general at 80. The station 80 will incorporate a receiving antenna assembly, which responds to the broadcasted transmission output to drive an antenna output corresponding with it. This assembly is represented generally at 82 and is seen to include the output from a receiving antenna represented at arrow and antenna symbol 84 and to carry out a preliminary pre-amplification of that antenna output as represented at block 86. As in the case of transmission, a Class A form of preamplifier generally is called for, inasmuch as a form of tuned circuit would, in effect, distort the missing cycle modulated carrier, tending to replace cycles which are missing. The resultant broadband pre-amplified antenna output is directed, as represented at arrow 88 to a multi-stage narrow-bandpass filter function represented at block 90. This band-pass filter 90 functions to reject all frequencies other than the designated carrier frequency and, as noted, avoids the discrepancies which would otherwise occur with a tuned form of reception. The receiver pre-amplification function represented at block 86 may be implemented, for instance, with a monolithic amplifier such as a Model MAR-1SM marketed by Mini-Circuits, Inc. (supra), while the band pass filter 90 may be implemented with filters such as a Model IF-70 marketed by Mini-Circuits, Inc. (supra). Band-pass filters are described in the following publications:

ARRL Handbook, p 16.15 (supra) "Microwave Filters, Impedance-Matching Networks, and Coupling Structures" by Matthaei, et al., ch 8 (1980) Artech House, Inc. (supra)

Filtering function 90 represents the initial component of a demodulator assembly and its output, as represented at arrow 92 will be a received modulated carrier signal which may be amplified robustly as represented at block 94 with a Class A form of amplification, again, avoiding a tuned form of amplification. The resultant amplified received modulated carrier signal, as represented at arrow 96 and block 98, is submitted to a squaring amplifier which essentially is present as an overdriven R.F. amplifier evoking square waves out of the R.F. sinusoid transmissions. The result is a recreation of the initial datastream input to the system, which is represented at arrow 100. The data output is represented at block 102, which, as in the case of the input, generally will be employed with Ethernet protocol, for submittal to a data network as represented at arrow 104. Over-driven amplifiers are described, for example, in the following publication:

ARRL Handbook, pp 8.20–8.26 (1999)) The American Radio Relay League, Inc. (supra).

Figure 4:
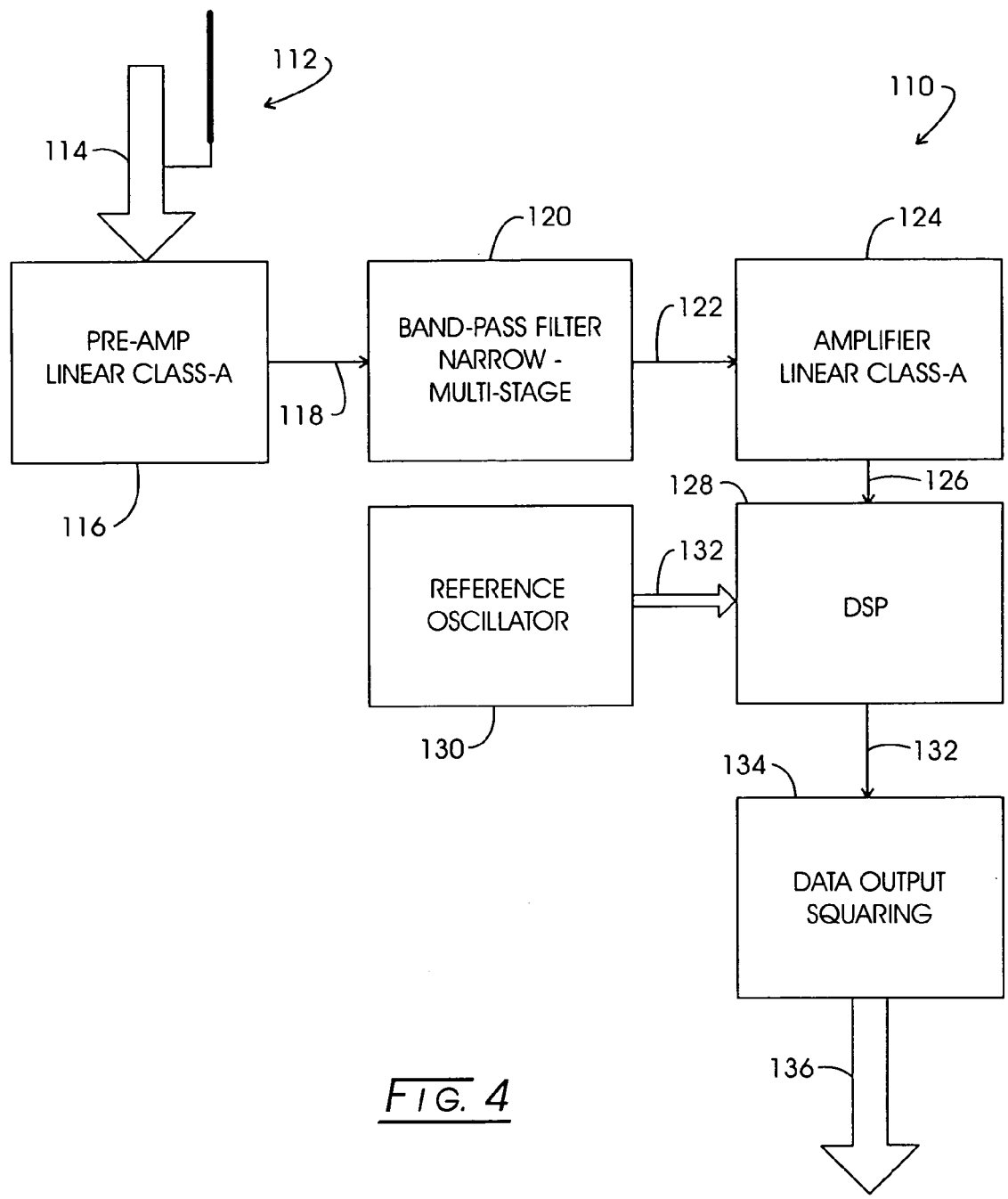
FIG. 4 is a block schematic diagram showing an alternate embodiment for a receiving station according to the invention.

Another, more elaborate receiving station architecture may be provided with the instant system. Referring to FIG. 4, such a receiving station or assembly is represented generally at 110. As before, the station 110 includes a receiving antenna assembly represented generally at 112 which includes an antenna having an antenna derived signal represented at arrow 114. That antenna derived signal is pre-amplified with a Class A pre-amplification stage, as before and now represented at block 116. The pre-amplified antenna output then, as represented at arrow 118, is directed to a narrow-bandpass filter represented at block 120. The filter stage 120 functions to shunt or reject all frequencies other than the carrier frequency and a received modulated carrier signal is developed as represented at arrow 122. As before, this received modulated carrier signal then is amplified employing a Class A amplifier as represented at block 124. The amplified output from amplification stage 124 is represented at arrow 126. Demodulation of this signal, for the present embodiment, is carried out with a digital signal processor (DSP) represented at block 128. DSP 128 may be provided, for example, as a type TMS320C6203 fixed-point digital signal processor marketed by Texas Instruments, Inc. of Dallas Tex. Device 128 performs in conjunction with a reference oscillator represented at block 130 which provides a reference output at the carrier frequency as represented at arrow 132. DSP 128 carries out a comparison of the incoming signal from arrow 126 with the reference oscillator output to determine the presence or absence of wavelet components of the signal at arrow 126. The resultant analysis creates an identification of the binary components of the signal 126 as then is presented, as represented at arrow 132, to a data output squaring function represented at block 134. The original digital datastream then is reproduced for submittal to a data network utilizing Ethernet protocols as represented at arrow 136.

A component referred to as a phase detector can be employed in place of the DSP function 128 in conjunction with the oscillator 130. Such phase detectors may be provided, for example, as model MPD-21 marketed by Mini-Circuits, Inc. (supra). In effect, the output at arrow 132 will be a DC level representing a binary value, for example, in the absence of the carrier wavelet and in presence of such wavelet.

The transmission and reception approaches of the invention thus far described are of a single channel variety wherein a single carrier at a single carrier frequency is employed. Because essentially no sideband development occurs with the instant system, carrier frequencies can be selected from closely adjacent positions within the R.F. spectrum so as to provide for a parallel, word-defining form of transmission or broadcasting. This permits a further enhancement of transmission speed.

Figure 5:
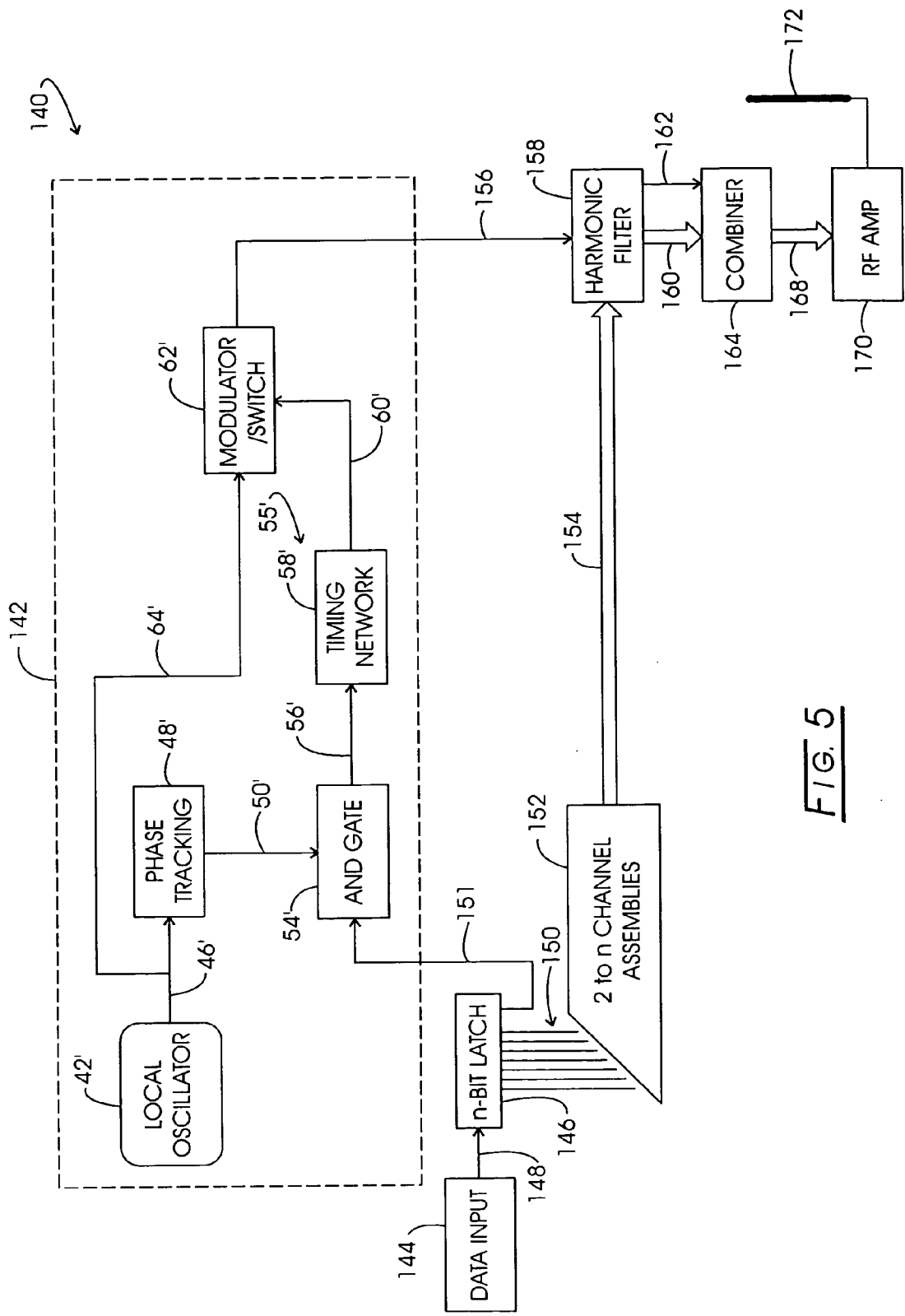
FIG. 5 is a block schematic diagram illustrating a multichannel adaptation of the missing cycle modulation transmission station according to the invention.

Referring to FIG. 5, a multi-channel transmission station is represented generally at 140. Essentially any number of channels may be employed with the station 140, for example, from 2 to 64, the channels herein being represented as channels 1–n. The first transmission channel is represented within the dashed boundary 142 and is structured essentially identically as the assembly described in connection with FIG. 2. Accordingly, identical components are represented with the same numeration as used in that figure but in primed fashion. With the multi-channel arrangement 140, data input now is represented at block 144. The digital binary datastream represented at block 144 is introduced, using, for example, Ethernet protocols, to an n-bit latch 146 as represented at arrow 148. At latch 146, the serial digital data input is translated into an n-bit word, each component of which is represented at a lead of the parallel lead array represented in general at 150. The lead for the first channel 142 is shown as arrow 151 extending to the AND gate function 54'. Each successive lead of the array 150 extends to a corresponding AND gate function in the second to nth transmission channel assemblies represented at symbol 152. The outputs of the second to nth channels are represented at bus arrow 154. Each of the channel transmission assemblies incorporates a local oscillator deriving a unique carrier frequency. In the present demonstration, the initial channel assembly local oscillator is shown at 42'. As noted above, frequencies assigned for the carrier function may be selected from the radio frequency spectrum at quite close values, inasmuch as essentially no sideband frequencies are generated with the system. As before, and for each of the n channel assemblies, the output of the local oscillator at arrow 46' is submitted to a phase tracking function 48' to detect zero crossing. The resultant crossover output signals are directed as represented by arrow 50', to the AND Gate function 54'. The potential zero crossing switching position of the carrier waveform and the digital binary data input from the n-bit latch 146, here shown at arrow 151, are logically ANDed at the AND Gate 54' of a synchronizer assembly 55'. The data at arrow 151, having been synchronized with a zero crossing position of the carrier waveform, provides a carrier synchronized information output at arrow 56'. As before, propagation errors and the like are accommodated for at a timing network of the synchronizater assembly 55' shown at block 58' and the resultant synchronizing control outputs are directed, as represented by arrow 60' to a modulator/switch function represented at block 62'. Modulator/switch function 62' responds to the local oscillator generated carrier as represented by arrows 46' and 64' and functions to turn off the carrier with respect to a designated binary value for an interval of at least one wavelet cycle. A resulting missing cycle modulated output, which is a selectively interrupted waveform at the first selected carrier frequency is provided at arrow 156. Each of the n channels are configured with the same architecture. All of the outputs as represented at array arrow 154 and arrow 156 are subjected to harmonic filtering as represented at block 158 and the outputs then are directed, as represented by bus arrow 160 and arrow 162 to a combiner 164. The combiner 164 may be implemented, for example, as a model JCPS-8-850-75 combiner marketed by Mini-Circuits, Inc. (supra). Combiner 164, in effect, sorts the outputs of each of the n-channels for submittal to individual R.F amplification as represented at block 176 and bus arrow 168 whereupon, the combined missing cycle modulated carriers are broadcast or transmitted by an antenna function represented at 172.

Figure 6:
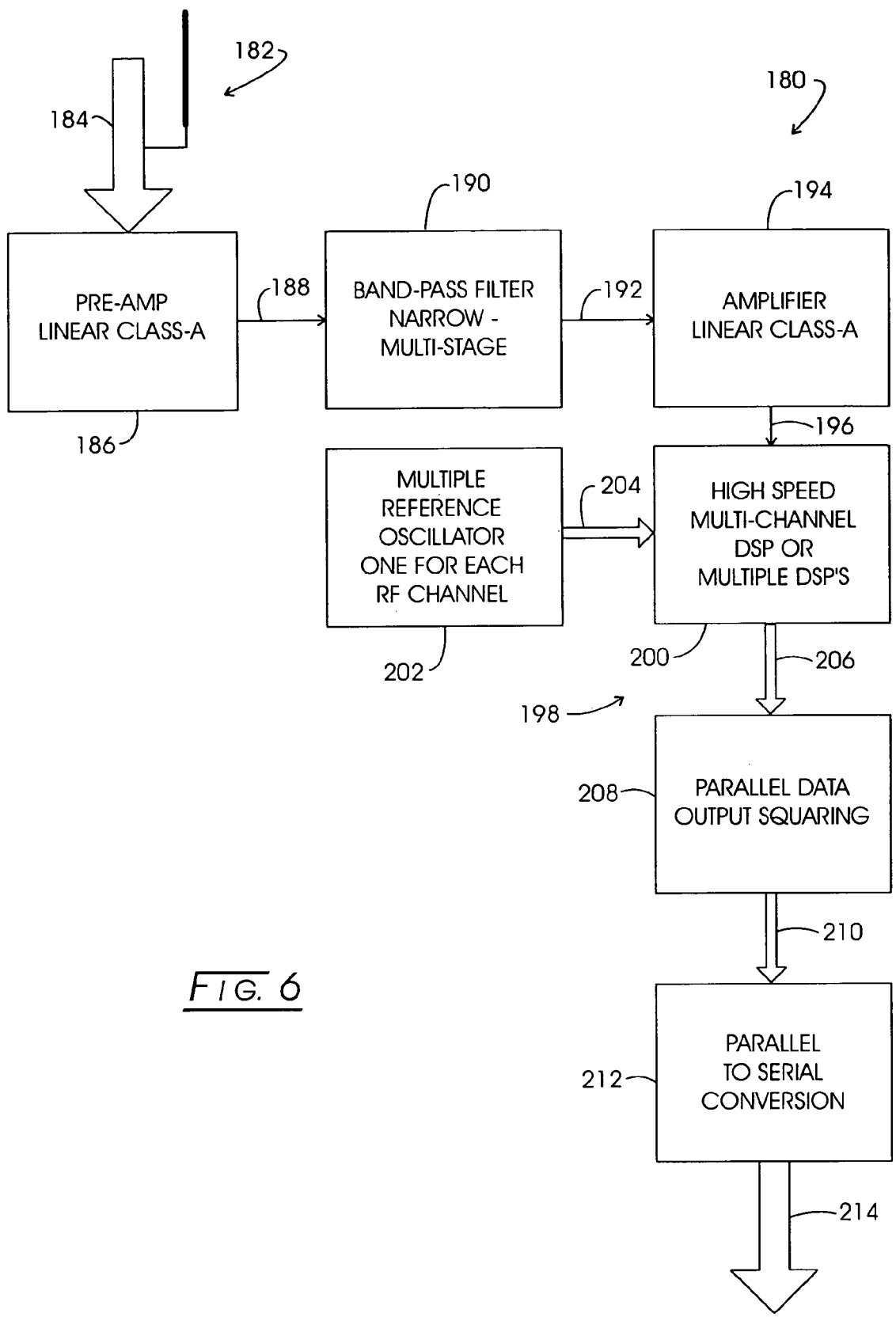
FIG. 6 is a block schematic diagram showing a multichannel receiving station configured to perform with the transmissions developed by the multi-channel transmitting station of FIG. 5.

Referring to FIG. 6, a multi-channel receiving station or assembly is represented generally at 180. Resembling the receiving station 110 described in connection with FIG. 4, the station 180 includes a receiving antenna assembly represented generally at 182. This assembly 182 includes an antenna responding to the combiner associated transmission output as represented at arrow 184 which is pre-amplified with a Class A form of amplifier as represented at block 186 to provide an antenna output represented at arrow 188. The antenna output at arrow 188 then is directed to a multi-stage narrow-bandpass filter function represented at block 190 which rejects or shunts frequencies other than the n carrier frequencies at hand which are arranged generally in seriatim fashion due to the combiner function earlier described. The multi-channel received and modulated carrier signals then are amplified as represented at arrow 192 and block 194. As before, this amplification is carried out with a Class A amplifier incorporating no resonant tuning features or the like. The amplified output then, as represented at arrow 196 is directed to a demodulating function represented generally at 198. In this regard, the amplified modulated carrier signals at arrow 196 are directed a multi-channel digital signal processor (DSP) assembly which alternately may be implemented as multiple DSPs. Each channel of the multi-channel DSP function 200 operates in conjunction with n reference frequencies, one such frequency corresponding with each carrier involved in the system. These multiple reference frequencies are represented at block 202 and bus arrow 204. The thus demodulated information then is directed, as represented at n-channel bus arrow 206 to a parallel data output squaring function represented at block 208. As before, the function 208 may be implemented with n-channels of amplification. The resultant parallel data signals then, as represented at n-channel bus arrow 210 are converted from their n-channel parallel relationship to a serial output as represented at block 212 to recreate the originally developed digital binary datastream which is directed utilizing Ethernet protocols to a data network as represented at arrow 214.

Figure 7:
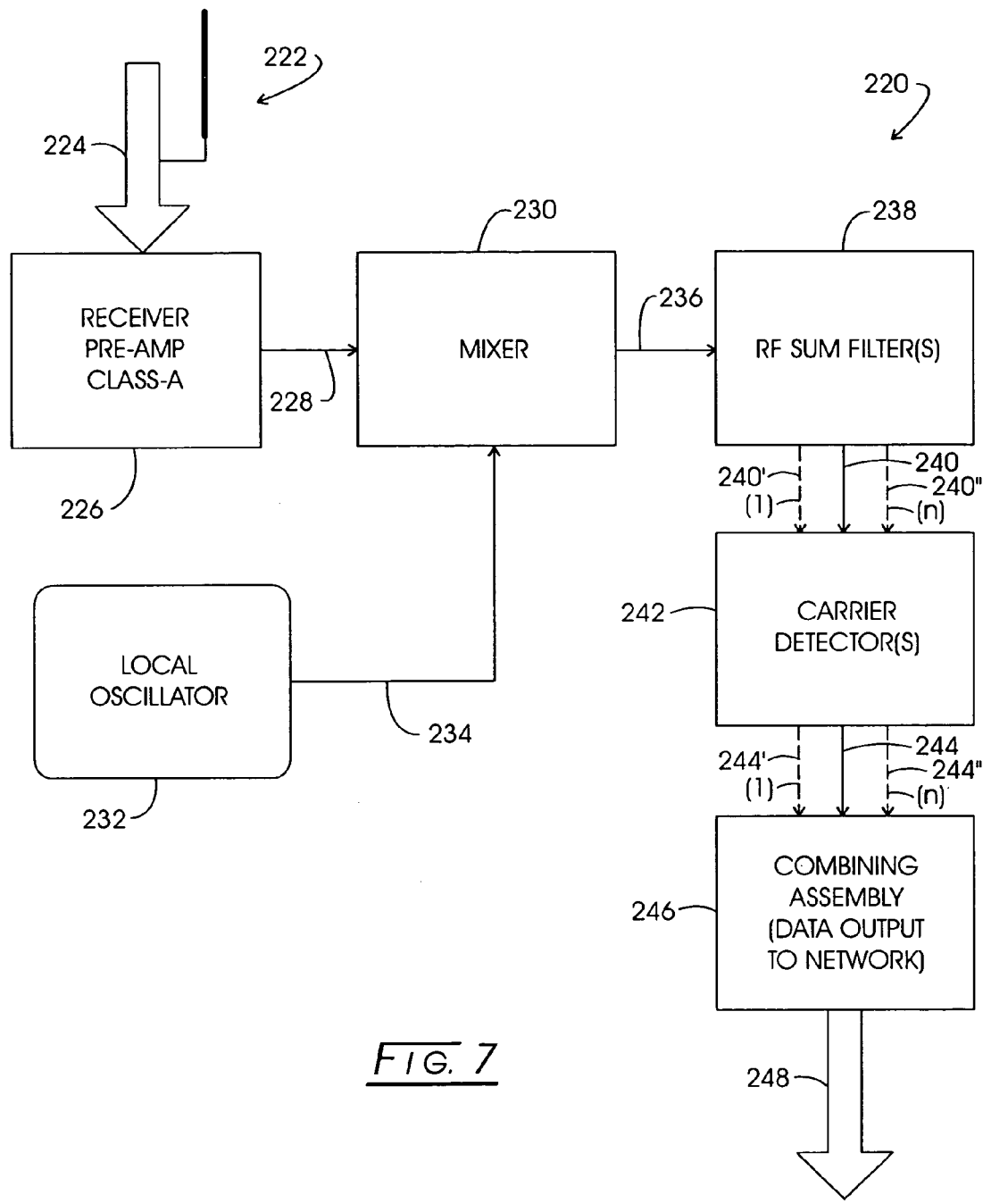
FIG. 7 is a block schematic diagram showing a multichannel or single channel receiving station employing a mixer function and which is configured to perform with the transmission carried out with MCM modulation.

Referring to FIG. 7, another receiver implementation for the MCM binary data transmissions or broadcasts is revealed in block diagrammatic form. This implementation harkins to traditional heterodyne detectors which often are referred to as "mixers", particularly in connection with superheterodyne receivers. Traditionally, those mixers incorporate a variable frequency output local oscillator which is combined in summing fashion with a broadcast carrier to derive an intermediate frequency output which is information modulated and is easier to discriminate in subsequent filtering stages. The instant receiver assembly, however, employs mixing preferably in conjunction with a local oscillator of frequency value higher than that of the incoming carrier frequency to evoke an intermediate frequency mixed or summed output which improves the wavelet-defined definition of a binary value with respect to subsequent filtering procedures. The now intermediate frequency MCM modulated intermediate carrier then can be submitted to a carrier detector function to strip the intermediate carrier and generate pulses of energy defining a selective binary value, i.e., a d.c. square wave representing the noted binary information is evoked.

In the figure, a receiving assembly or station is represented generally at 220. Similar to the receiving station 110 described in connection with FIG. 4, the assembly 220 includes a receiving antenna assembly represented generally at 222. This assembly 222 includes an antenna responding to the broadcast and modulated carrier as well as other electromagnetic phenomena encountering it to submit such antenna derived broadband signal information, as represented at arrow 224 to the input of a receiver preamplifier represented at block 226. In conventional fashion, submittal to the amplifier stage 226 may be by coaxial cable, waveguides or the like. The receiver preamplifier, as before, will be of a variety which does not evoke resonance phenomena and may be implemented, for example, as a Class A form of amplifier which provides an antenna output as represented at arrow 228. As before, the antenna and preamplifier combination 222 is of a non-resonating or non-tuned variety and thus will respond to a broad variety of electromagnetic phenomena including a plurality of carrier frequencies. In this regard, it will respond to simulcast MCM modulated carrier frequencies which are at carrier frequency values representing a closely-spaced adjacency within the radio frequency spectrum.

The antenna output at arrow 228 is seen directed to a mixer assembly represented at block 230. Mixer assembly 230 receives the mixing frequency output of a receiver local oscillator represented at block 232 and arrow 234. This mixing assembly 230 then produces a mixed output at arrow 236 exhibiting intermediate frequency components in conventional fashion. In this regard, the components will include the original carrier frequency, the receiver local oscillator frequency, a component evidencing a summed frequency and a corresponding component evidencing a difference frequency.

For the MCM modulated carrier input at hand, the selection of the receiver local oscillator mixing frequency output preferably will be an integer multiple of the incoming carrier frequency. In this regard, that mixing frequency output will be at a mixing frequency which is an integer ratio with respect to the incoming carrier frequency. Preferably, the frequency selected for the receiver local oscillator 232 output will be greater than the carrier frequency and the result will provide an intermediate carrier which is pulse modulated as a sum intermediate frequency component to define binary data at the intermediate carrier frequency. As an example of this mixer feature implementation, a 200 MHz incoming MCM modulated carrier may be mixed with a 1000 MHz mixing frequency output at arrow 234 to derive a mixed output exhibiting intermediate frequency components of a sum variety providing 1200 MHz frequency value. Accordingly, the signal at arrow 236 is one, in essence, carrying a pulse defining beat component at the intermediate frequency and representing binary information corresponding with the MCM modulation of the incoming carrier wave. The exemplary representation, for instance, represents a ratio of 6-1 with respect to the mixing frequency and carrier frequency. Thus six cycles at the intermediate frequency will correspond with one wave cycle at the incoming MCM modulated carrier.

The mixed output exhibiting intermediate frequency components at arrow 236 then is directed to an R. F. sum filter assembly represented at block 238 which is configured as a band-pass filter stripping mixing frequency components other than that of the summed intermediate frequency mixer carrier. The thus derived intermediate carrier output is directed as represented at arrow 240 to the input of a carrier detector assembly represented at block 242. Assembly 242, in effect, strips the intermediate carrier from the information containing sum components and derives a binary information carrying pulse stream, which may be a d. c. squarewave, as an output represented at arrow 244.

That pulse stream carrying the binary information of the original data stream then may be employed in a variety of ways. One such approach, as represented at block 246 is to treat it in association with Ethernet protocols to provide a serial data output for submittal to the receiving input of a computer installation. This serial data output is represented at arrow 248.

A salient feature of the receiver assembly or station 220 resides in its ready implementation to receive and demodulate a plurality of broadcast incoming MCM modulated carriers, for example, such carriers as discussed in connection with FIG. 5 above. Inasmuch as the receiving antenna assembly 222 is not of a tuned variety, it is responsive to all electromagnetic phenomena which confronts it. Thus, this will include all of the data modulated carriers which, in accordance with the instant procedure, are closely spaced in frequency. For example, one carrier may center at 200 MHz, while the next adjacent carrier may be centered at 200.05 MHz. Thus, the signal evoked from the assembly 222 is a complex carrier signal incorporating more than one carrier as modulated in accordance with the MCM procedure. The mixer function 230 is utilized in this simulcast approach to enhance and develop an intermediate frequency spacing between the carriers to facilitate their discrimination by subsequent filtering activity. Thus, the frequency selected with respect to the local oscillator 232 generally will be higher than the incoming MCM modulated carrier frequency and only the higher or sum intermediate frequency carrier outputs will be elected for band-pass filtering. Using the example above, with a 1,000 MHz local oscillator mixing frequency, the noted 200.05 MHz MCM modulated carrier will produce an intermediate frequency modulated carrier output at 1200.3 MHz. This will be spaced from the 1200 MHz MCM modulated carrier earlier described to provide a 300 kHz spacing for subsequent filtering. Utilizing notch filter technology, this spacing frequency can be accommodated for without substantial crossover distortion. Accordingly, the various MCM modulated carriers which are closely spaced in center frequency are submitted from the mixing function 230 to derive a mixed output which then is filtered at filtering function 238. However, for n MCM modulated carrier frequencies, a corresponding n notch filter stages will be provided at the band-pass filter 238. Accordingly, what may be considered to be a parallel output, comprising one channel for each of the end filter stages will be provided as opposed to the singular filtered output at arrow 240. This is exemplified by the dashed arrows 240' and 240" representing a first channel (1) and a last channel, (n). Those parallel outputs then are directed to the carrier detector function at block 242. As before, a detector function is now configured with an architecture of n detector stages each of which is responsive to one of the n intermediate carrier outputs from the filtering function. The result is the derivation of n binary information outputs as opposed to the earlier described singular output represented at arrow 244. Accordingly, these outputs are represented by the dashed arrow 244', indicating the first (1) channel, and arrow 244", representing the last or nth channel (n). These binary information outputs may be submitted to a variety of user activities. In particular, they will typically be adjusted in accordance with Ethernet protocols and, accordingly, may be arranged to provide an output as represented at arrow 248 which is serial in nature.

Figure 8A:
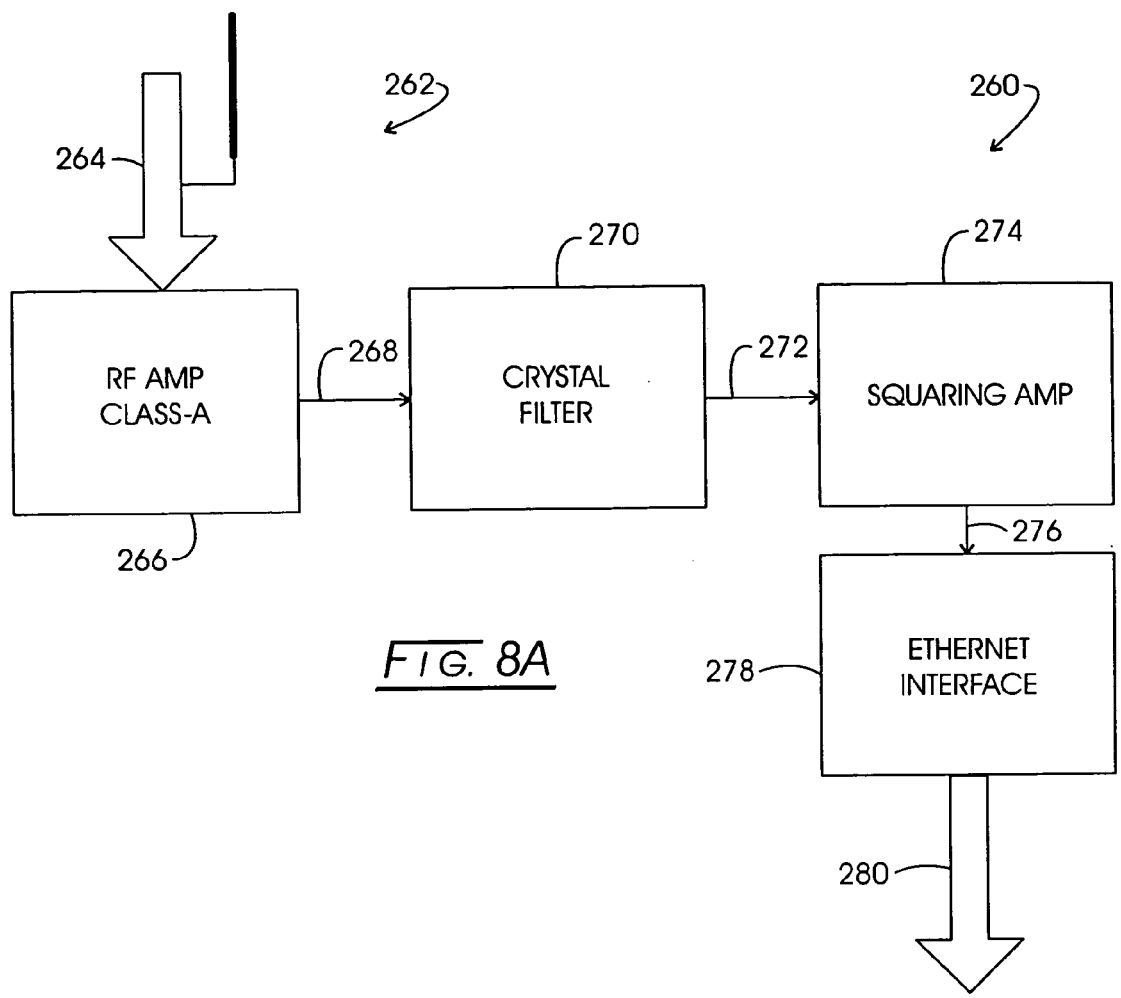
FIG. 8A is a block schematic diagram showing a receiver assembly employing a very narrow-bandpass crystal implemented R.F. filter in combination with a squaring amplification stage to derive a digital data stream from the output of a broadband antenna assembly.

Referring to FIG. 8A, a preferred receiver implementation for MCM binary data transmissions or broadcasts is revealed in block diagrammatic form. This implementation utilizes the earlier-described un-tuned or broadband antenna and associated introductory pre-amplification stage in combination with a very narrow band filter which performs in the presently contemplated R.F. frequency range. Referring to the figure, the assembly 260 includes a receiving antenna assembly represented generally at 262. This assembly 262 includes an antenna responding in broadband fashion to the broadcasted and modulated carrier as well as other electromagnetic phenomena encountering it, to submit such antenna-derived signal information, as represented by arrow 264, to the input of a receiver preamplifier represented at block 266. The receiver preamplifier, as before, will be of a variety which does not evoke resonance phenomena and may be implemented, for example, as a Class A form of amplifier which provides a broadband antenna output as represented at arrow 268. The antenna output represented at arrow 268 is directed to a very narrow bandpass filter represented at block 270. Filter 270 is provided as a crystal implemented filter, functioning at the radio frequencies as now contemplated, to provide a filtered output corresponding with the modulated carrier as represented at arrow 272. Filter function 270 may be implemented with a crystal filter identified as a part number PTI4171C marketed by Piezo Technology, Inc., of Orlando Fla.

The filtered output represented at arrow 272 then is submitted to a squaring amplifier stage represented at block 274. This amplification function 274 derives a binary information stream as represented at arrow 276. That datastream may be treated in a variety of ways. One approach for such treatment is represented at block 278 wherein the data is configured in association with Ethernet protocols to provide a serial data output for submittal to the receiving input of a computer installation. This serial data output is represented at arrow 280. Components employed in the Ethernet interface function will include, for example, a coupling component identified as part number RJ654 marketed by Transpower Technologies, Inc., of Reno, Nev., while an Ethernet interface processing component may be provided as a type DP838443 marketed by National Semiconductor Corp. of Santa Clara, Calif.

Figure 8B:
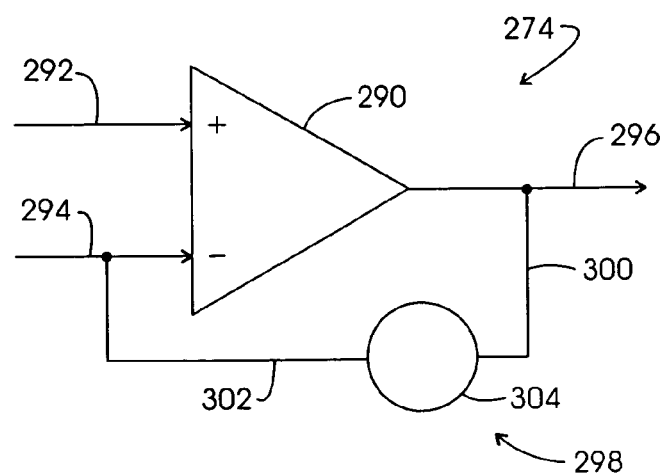
FIG. 8B is an electrical schematic diagram showing a squaring amplification stage represented in FIG. 8A.

Looking to FIG. 8B, a schematic representation of the squaring amplification function is portrayed. This squaring amplification stage 274 is configured about an operational amplifier 290 having a positive input which receives a signal from arrow 272 as represented at arrow 292 and a negative input represented at arrow 294. The output of device 290 is represented at arrow 296 and corresponds to the squarewave output as discussed above in connection with arrow 276. To provide the noted overdriven feature deriving the squarewave, a gain adjustment is provided as represented at feedback path 298 implemented by lines 300 and 302 incorporating a gain adjustment assembly 304 and extending from the output at arrow 296 to one input as represented at arrow 294.

Figure 9:
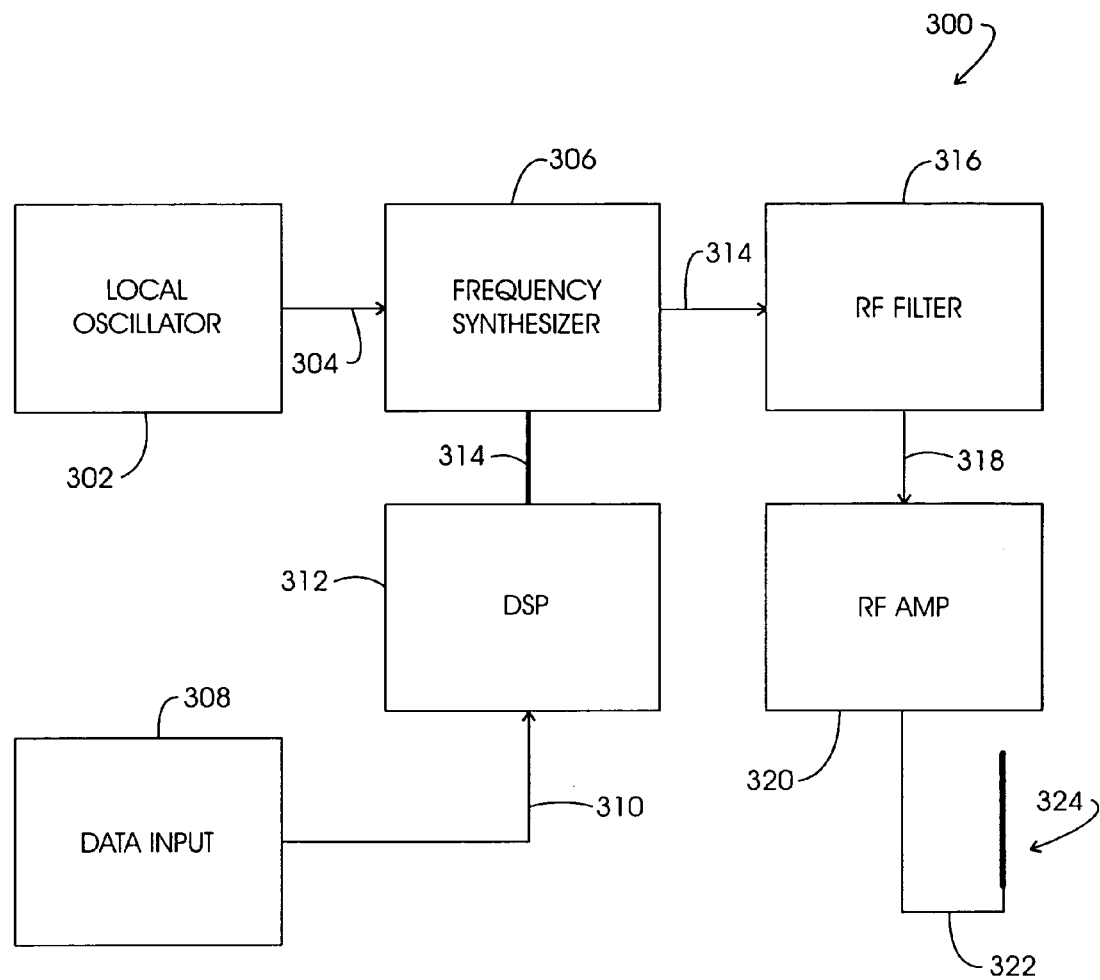
FIG. 9 is a block schematic diagram showing a synthesizer implementation of a transmitter assembly or station employing missing cycle modulation.

The somewhat discrete wavelet transmission feature of the invention also may be implemented with a synthesization approach wherein a stream of presence and absence of such wavelets is generated at the carrier frequency. FIG. 9 illustrates this form of direct frequency synthesis. Referring to the figure, the transmission assembly or station is represented generally at 300. Assembly 300 includes, as before, a local oscillator represented at block 302. Oscillator function 302 may be provided, for example, as a type POS-150 oscillator marketed by Mini Circuits, Inc. (supra). Oscillator 302 provides a carrier sinusoid at a predetermined carrier frequency as represented at arrow 304. This carrier signal represented at arrow 304 is directed to one input of a frequency synthesizer represented at block 306. Device 306 employs a technology generally referred to as direct frequency synthesis. In general, these synthesizer devices utilize digital datastream technology (DDS) in combination with an internal high-speed, high-performance digital to analog converter arrangement and a comparator to form a digitally programmable agile synthesizer function. The device generates a highly stable, frequency-phase, amplitude-programmable sinewave output particularly adaptable to communications applications. Such devices are marketed as type AD9852 by Analog Devices, Inc. of Norwood Mass.

The datastream input to transmitter assembly 300 is represented at block 308 which generally will receive binary information from such datastream through Ethernet protocols or the like. The resultant binary information carrying pulsed output of the data input 308 is represented at arrow 310 which, in turn, is directed to the input of a digital signal processor (DSP) represented at block 312. DSP 312 may be provided, for example, as a type C6000, Marketed by Texas Instruments, Inc. of Dallas Tex. Processor 312 functions to program the frequency synthesizer 306 to operate in what is generally referred to as a "chirp" mode via digital control line inputs represented at bus 314. The synthesizer 306 then synthesizes wavelets in a program wherein the wavelets are either present, indicating one binary value, or not present indicating the opposite binary value (1 or 0) at the select carrier frequency as an output condition signal at an output represented at arrow 314. This presence-absence wavelet binary information then is filtered to remove spurious noise or harmonic distortion as represented at block 316. The filter function represented at block 316 may be implemented with a type 6880C R. F. filter marketed by Piezo Technology, Inc. (supra). A resultant filter output, as represented by arrow 318 then may be amplified, as before, employing a Class A amplifier as represented at block 320. The amplifier function represented at block 320 may be implemented, for example, by a type MAN-1HLN amplifier marketed by Mini Circuits, Inc. (supra). The resultant amplified output is represented at arrow 322 of an antenna assembly represented at 324 which carries out the broadcasting of the output condition signal at the selected carrier frequency.

Since certain changes may be made in the above-described system, apparatus and method without departing from the scope of the invention herein involved, it is intended that all matter contained in the description thereof or shown in the accompanying drawings shall be interpreted as illustrative and not in a limiting sense.

What is claimed is:

1. A method for transmitting binary information from an information stream, comprising the steps of:

(a) generating an R.F. carrier at a select carrier frequency by providing a local oscillator having an oscillator output at said carrier frequency and exhibiting a waveform with a continuous sequence of wavelets each being defined by a 360 degree cycle between crossover positions each of which represents a substantially zero energy level;

(b) receiving said information stream as a given sequence of first and second binary signals;

(c) synchronizing said sequence of first and second binary signals with the carrier continuous sequence of wavelet crossover positions to provide synchronizing control outputs corresponding with said first and second binary signals by phase tracking said carrier to provide a phase signal identifying said crossover positions, and combining said phase signal with said given sequence of first and second binary signals to derive said synchronizing control outputs;

(d) modulating said carrier in response to said synchronizing control outputs by terminating said carrier between an integer number of wavelets defining crossover positions to derive the first binary signal and transmitting an integer number of said wavelets between said crossover positions within said sequence to derive the second binary signal permitting the carrier modulation termination and transmission to persist for an interval of at least an integer number of full cycle wavelets by switching said carrier off and on in response to said synchronizing control outputs without effecting a sideband generating distortion thereof, wherein said combining of said phase signal with said sequence of first and second binary signals is accomplished with select delays for permitting said carrier modulation termination and transmission to persist for an interval of at least a full cycle wavelet; and (e) broadcasting the modulated carrier.

2. The method of claim 1 in which said step (d) for modulating said carrier includes the step of filtering to remove harmonics from said modulated carrier.

3. The method of claim 1 including the steps of:

(f) providing a receiver station having an antenna responsive to the broadcasted modulated carrier and having an antenna output;

(g) extracting a received modulated carrier signal from said antenna output without effecting distortion thereof;

(h) demodulating said received modulated carrier signal by detecting the respective absence and presence of said wavelets to identify binary information corresponding with said first and second binary signals;

(i) deriving a binary information stream from said demodulated received modulated carrier signal; and (j) providing said binary information stream at a receiver output.

4. The method of claim 3 in which said step (g) for extracting a received modulated carrier signal is carried out by non-resonantly pre-amplifying said antenna output to provide a pre-amplified antenna output, and filtering said pre-amplified antenna output to provide a band pass output substantially at said carrier frequency.

5. The method of claim 3 in which:

said step (h) for demodulating said received carrier signal is carried out by providing a reference oscillator with a reference output at said carrier frequency and providing a digital signal processor responsive to said reference output and said received modulated carrier signal to effect a comparison there between and propagate said first binary signal in the absence of the wavelets and said second binary signal in the presence of the wavelets at said received modulated carrier signal.

6. The method of claim 1 including the steps of:

(f) reiterating said step (a) to carry out the generation of n R.F. carriers, each having a unique said carrier frequency;

(g) said step (b) receives said information stream as a serial said given sequence of first and second binary signals each n successive signals of which are arranged as an n-bit binary word;

(h) said steps (c), (d) and (e) are reiterated for each of said n successive signals in conjunction with one of said n R.F. carriers.

7. The method of claim 6 including the steps of:

(i) providing a receiver assembly having an antenna assembly responsive to n modulated carriers to provide an antenna output;

(j) extracting a received modulated complex carrier signal from said antenna output without effecting the distortion thereof;

(k) providing a receiver local oscillator having a select mixing frequency output;

(l) mixing said mixing frequency output with said complex carrier signal to derive a mixed output exhibiting unique frequency components corresponding with the frequencies of said n R.F. carriers;

(m) providing a filtering assembly with n filter stages, each responsive to said mixed output to derive respective n intermediate carrier outputs at n select, spaced discriminate intermediate frequency components; and (n) providing a detector assembly having n detector stages, each responsive to a respective one of said n intermediate carrier outputs to derive respective n binary information outputs.

8. The method of claim 7 including the step of:

(o) combining said n binary information outputs into a serial binary datastream.

9. The method of claim 1 including the steps of:

(f) reiterating said step (a) to carry out the generation of n R.F. carriers, each having a unique said carrier frequency;

(g) said step (b) receiving n information streams each as a unique said given sequence of first and second binary signals;

(h) said steps (c), (d) and (e) are reiterated for each of said n R. F. carriers to provide a broadcasting of n modulated carriers;

(i) providing a receiver assembly having an antenna assembly responsive to said n modulated carriers to provide an antenna output;

(j) extracting a received modulated complex carrier signal from said antenna output without effecting the distortion thereof;

(k) providing a receiver local oscillator having a select mixing frequency output;

(l) mixing said select mixing frequency with said received modulated complex carrier signal to derive a mixed output exhibiting unique frequency components corresponding with the frequencies of said n R.F. carriers;

(m) providing a filtering assembly with n filter stages each responsive to said mixed output to derive respective n intermediate carrier outputs at n select, spaced discriminate intermediate frequency components; and (n) providing a detector assembly having n detector stages, each responsive to a respective one of said n intermediate carrier outputs to derive respective n binary information outputs.

10. The method of claim 9 including the step of:

(o) combining said n binary information outputs into a serial binary datastream.

11. The method of claim 1 including the steps of:

(f) providing a receiver assembly having an antenna exhibiting a broadband reception characteristic providing respective response to the broadcasted modulated carrier and having an antenna output corresponding with said broadband reception;

(g) amplifying said antenna output to provide a received signal without effecting distortion of said antenna output;

(h) submitting said received signal to a narrow band filtering stage to provide a filtered output corresponding with said modulated carrier;

(i) deriving a binary information stream from said filtered output; and (j) providing said binary stream at a receiver output.

12. The method of claim 11 in which said step (g) for amplifying said antenna output is carried out with a Class A amplifier.

13. The method of claim 11 in which said step (h) for submitting said received signal to a narrow band filtering stage is carried out with a crystal implemented R.F. filter.

14. The method of claim 11 in which said step (i) for deriving a binary information stream is carried out with a squaring amplifier.

15. A method for transmitting and receiving binary information derived from an information stream, comprising the steps of:

(a) generating an R.F. carrier at a select carrier frequency and exhibiting a waveform with a continuous sequence of wavelets each being defined by a 360 degree cycle between crossover positions each of which represents a substantially zero energy level;

(b) receiving said information stream as a given sequence of first and second binary signals;

(c) synchronizing said sequence of first and second binary signals with the carrier continuous sequence of wavelet crossover positions to provide synchronizing control outputs corresponding with said first and second binary signals;

(d) modulating said carrier in response to said synchronizing control outputs by terminating said carrier between an integer number of wavelets defining crossover positions to derive a said first binary signal and transmitting an integer number of said wavelets between said crossover positions within said sequence to derive a said second binary signal permitting the carrier modulation termination and transmission to persist for an interval of at least an integer number of full cycle wavelets;

(e) broadcasting the modulated carrier;

(f) providing a receiver assembly having an antenna responsive to the broadcasted modulated carrier and having an antenna output;

(g) extracting a received modulated carrier signal from said antenna output without effecting distortion thereof;

(h) providing a receiver local oscillator having a select mixing frequency output;

(i) mixing said mixing frequency output with said received modulated carrier signal to derive a mixed output exhibiting intermediate frequency components;

(j) filtering said mixed output to derive a select intermediate carrier output at a select intermediate frequency component;

(k) detecting the pulse categorized components of said select intermediate carrier output to derive a binary information output corresponding with said binary information of said information stream; and (l) providing an output binary signal corresponding with said binary information output at a receiver output.

16. The method of claim 15 in which said step (h) provides said select mixing frequency output at a mixing frequency representing an integer multiple of said select carrier frequency.

17. The method of claim 15 in which said step (h) provides said select mixing frequency output at a mixing frequency which is an integer ratio with respect to said select carrier frequency.

18. The method of claim 17 in which said step (h) provides said select mixing frequency output at a frequency level greater than said select carrier frequency.

19. The method of claim 17 in which said step (j) in which said select intermediate frequency component is a sum intermediate frequency component.

20. A system for transmitting binary information from a digital information stream, comprising:

a transmission assembly including:

a local oscillator generating an R.F. carrier at a select carrier frequency exhibiting a waveform with a continuous sequence of wavelets each exhibiting a period of 360 degrees defined between zero crossover positions;

a phase tracking assembly, responsive to said carrier and having a crossover output at said zero crossover positions defining a wavelet;

a synchronizer assembly having an input responsive to said digital information stream and to said crossover output and providing synchronizing control outputs corresponding with first and second binary signals representing said binary information;

said synchronizer assembly includes an ANDing assembly having said synchronizing control outputs upon the synchronized occurrence of said first and second binary signals with a said crossover output;

a modulator assembly responsive to said R.F. carrier and to said synchronizing control outputs for deriving a transmission output by switching said R.F. carrier off at a zero crossover position for a period of an integer number of wavelets to define said first binary signal and for transmitting said carrier for said period of an integer number of wavelets to define said second binary signal permitting the carrier modulation switching-off and transmission to persist for an interval of at least an integer number of full cycle wavelets; and an R. F. transmission assembly including an antenna and responsive to said transmission output for effecting a broadcast thereof at said select carrier frequency as a broadcasted transmission output; and a receiving assembly including:

a receiving antenna assembly responsive to said broadcasted transmission output to derive an antenna output corresponding therewith;

a filter assembly responsive to said antenna output for deriving a received modulated carrier signal; and a demodulator assembly responsive to said received modulated carrier signal to detect the respective absence and presence of said wavelets to derive received binary information corresponding with said binary information from said digital information stream.

21. The system of claim 20 in which said synchronizer assembly includes a timing network responsive to said synchronizer control outputs for extending the duration of each to correspond with the said period of at least one said wavelet.

22. The system of claim 20 in which said R.F. transmission assembly includes a Class A amplifier coupled with said antenna and responsive to amplify said transmission output.

23. The system of claim 20 in which said modulator assembly includes a harmonic filter for removing harmonics from said transmission output.

24. The system of claim 20 in which said receiving antenna includes:
 a receiving antenna responsive to said broadcasted output; and
 a pre-amplifier of Class A configuration coupled with said receiving antenna and deriving said antenna output.

25. The system of claim 20 in which said filter assembly includes a band pass filter responsive to said antenna output and configured for passing substantially only said antenna output at said carrier frequency.

26. The system of claim 20 in which:
 said filter assembly comprises a narrow-bandpass filtering stage provided as a R.F. crystal implemented filter selected for passing said select carrier frequency.

27. The system of claim 20 in which:
 said demodulator assembly comprises a squaring amplifier.

28. A system for transmitting binary information from a digital information stream, comprising:
 a transmission assembly including:
 a local oscillator generating an R.F. carrier at a select carrier frequency exhibiting a waveform with a continuous sequence of wavelets each exhibiting a period of 360 degrees defined between zero crossover positions;
 a phase tracking assembly, responsive to said carrier and having a crossover output at said zero crossover positions defining a wavelet;
 a synchronizer assembly having an input responsive to said digital information stream and to said crossover output and providing synchronizing control outputs corresponding with first and second binary signals representing said binary information;
 a modulator assembly responsive to said R.F. carrier and to said synchronizing control outputs for deriving a transmission output by switching said R.F. carrier off at a zero crossover position for a period of an integer number of wavelets to define said first binary signal and for transmitting said carrier for said period of an integer number of wavelets to define said second binary signal permitting the carrier modulation switching-off and transmission to persist for an interval of at least an integer number of full cycle wavelets; and
 an R. F. transmission assembly including an antenna and responsive to said transmission output for effecting a broadcast thereof at said select carrier frequency as a broadcasted transmission output; and
 a receiving assembly including:
 a receiving antenna assembly responsive to said broadcasted transmission output to derive an antenna output corresponding therewith;
 a filter assembly responsive to said antenna output for deriving a received modulated carrier signal;
 a demodulator assembly responsive to said received modulated carrier signal to detect the respective absence and presence of said wavelets to derive received binary information corresponding with said binary information from said digital information stream;
 said demodulator assembly comprising a first Class A amplifier stage responsive to said received modulated carrier signal to derive an amplified received modulated carrier signal; and
 a second Class A amplifier stage responsive to said amplified received modulated carrier signal for deriving said received binary information in rectangular wave form.

29. A system for transmitting binary information from a digital information stream, comprising:
 a transmission assembly including:
 a local oscillator generating an R.F. carrier at a select carrier frequency exhibiting a waveform with a continuous sequence of wavelets each exhibiting a period of 360 degrees defined between zero crossover positions;
 a phase tracking assembly, responsive to said carrier and having a crossover output at said zero crossover positions defining a wavelet;
 a synchronizer assembly having an input responsive to said digital information stream and to said crossover output and providing synchronizing control outputs corresponding with first and second binary signals representing said binary information;
 a modulator assembly responsive to said R.F. carrier and to said synchronizing control outputs for deriving a transmission output by switching said R.F. carrier off at a zero crossover position for a period of an integer number of wavelets to define said first binary signal and for transmitting said carrier for said period of an integer number of wavelets to define said second binary signal permitting the carrier modulation switching-off and transmission to persist for an interval of at least an integer number of full cycle wavelets;
 an R. F. transmission assembly including an antenna and responsive to said transmission output for effecting a broadcast therefore at said select carrier frequency as a broadcasted transmission output; and
 a receiving assembly including:
 a receiving antenna assembly responsive to said broadcasted transmission output to derive an antenna output corresponding therewith;
 a filter assembly responsive to said antenna output for deriving a received modulated carrier signal;
 a demodulator assembly responsive to said received modulated carrier signal to detect the respective absence and presence of said wavelets to derive received binary information corresponding with said binary information from said digital information stream;
 said demodulator assembly comprising a Class A amplifier stage responsive to said received modulated carrier signal to derive an amplified received modulated carrier signal;
 a reference oscillator with a reference output at said carrier frequency; and
 a digital signal processor responsive to said reference output and to said amplified received modulated carrier signal to effect a comparison therebetween and propagate said first binary signal in the absence of the wavelets and said second binary signal in the presence of the wavelets at said amplified received modulated carrier signal.

30. Apparatus for transmitting binary information from an information stream, comprising:
 a local oscillator generating an R.F. carrier at a select carrier frequency, exhibiting a waveform with a continuous sequence of wavelets each extending between zero crossover positions defining wavelet periods of 360 degrees and exhibiting substantially zero electromagnetic wave energy;
 a phase tracking assembly responsive to said carrier and having a crossover output at said crossover positions defining a wavelet;

a synchronizer assembly responsive to said information stream and to said crossover output and deriving synchronizing control outputs corresponding with first and second binary signals representing said binary information;

said synchronizer assembly includes an ANDing assembly having said synchronizing control outputs upon the synchronized occurrence of said first and second binary signals with a said crossover output;

a modulator assembly responsive to said R.F. carrier and to said synchronizing control outputs and deriving a transmission output by switching said R.F. carrier off at a said crossover position for an integer number of the period of the wavelet to define said first binary signal and for transmitting said carrier for at least an integer number of a period of the wavelet commencing and ending with said crossover position to define said second binary signal permitting the carrier modulation switching-off and transmission to persist for an interval of at least an integer number of full cycle wavelets; and an R.F. transmission assembly, including an antenna responsive to said transmission output for effecting a broadcast thereof.

31. The system of claim 30 in which said synchronizer assembly includes a timing network responsive to said synchronizing control outputs, for extending the duration of each to correspond with the said period of at least one said wavelet.

32. The system of claim 30 in which said R.F. transmission assembly includes a Class A amplifier coupled with said antenna and responsive to amplify said transmission output.

33. The system of claim 30 in which said modulator assembly includes a harmonic filter for removing harmonics from said transmission output.

34. A system for transmitting binary information from a digital information stream, comprising:

a transmission assembly including:

a local oscillator generating an R.F. carrier at a select carrier frequency exhibiting a waveform with a continuous sequence of wavelets each exhibiting a period defined between zero crossover positions;

a phase tracking assembly, responsive to said carrier and having a crossover output at said crossover positions defining a wavelet;

a synchronizer assembly having an input responsive to said digital information stream and to said crossover output and providing synchronizing control outputs corresponding with first and second binary signals representing said binary information;

a modulator assembly responsive to said R.F. carrier and to said synchronizing control outputs for deriving a transmission output by switching said R.F. carrier off at a crossover position for a period of one or more said wavelets to define said first binary signal and for transmitting said carrier for said period of one or more said wavelets to define said second binary signal; and an R.F. transmission assembly including an antenna and responsive to said transmission output for effecting a broadcast thereof at said select carrier frequency as a broadcasted transmission output;

a receiving assembly including:

a receiving antenna assembly responsive to said broadcasted transmission output to derive an antenna output corresponding therewith;

a receiver local oscillator having a select mixing frequency output;

a mixer assembly responsive to said select mixing frequency output and to said antenna output to derive a mixed output exhibiting intermediate frequency components;

a filter assembly responsive to said mixed output to derive a select intermediate carrier output at a select intermediate frequency component; and a detector assembly responsive to said select intermediate carrier output to derive a binary information output corresponding with said binary information of said digital information stream.

35. The system of claim 34 in which receiver local oscillator select mixing frequency output is an integer multiple of said select carrier frequency.

36. The system of claim 34 in which the receiver local oscillator select mixing frequency output is at a mixing frequency which is an integer ratio with respect to said select carrier frequency.

37. The system of claim 36 in which said select mixing frequency output mixing frequency is greater than said select carrier frequency.

38. The system of claim 36 in which said select intermediate frequency component is a sum intermediate frequency component.

39. The system of claim 34 in which:

said transmission assembly is reiterated as n transmission assemblies providing n discrete broadcasted transmission outputs;

said receiving antenna assembly is responsive to said n discrete broadcasted transmission outputs to provide said antenna output corresponding therewith;

said filter assembly includes n filter stages each responsive to said mixed output to derive respective n said intermediate carrier outputs at n select, spaced discriminate intermediate frequency components; and said detector assembly includes n discriminator stages responsive to respective said n intermediate carrier outputs to derive n respective said binary information outputs.

* * * * *